United States Patent
Nishijima

[11] Patent Number: 4,625,578
[45] Date of Patent: Dec. 2, 1986

[54] STEERING WHEEL ASSEMBLY
[75] Inventor: Kazuyoshi Nishijima, Fuji, Japan
[73] Assignee: Nihon Plast Co., Ltd., Shizuoka, Japan
[21] Appl. No.: 691,107
[22] Filed: Jan. 14, 1985
[30] Foreign Application Priority Data Jan. 18, 1984 [JP] Japan .................................. 59-6722

[51] Int. Cl.$^4$ ............................................. G05G 11/00
[52] U.S. Cl. .................... 74/484 R; 74/498; 74/552; 200/61.54
[58] Field of Search ............ 74/484 R, 552, 498, 74/803; 200/61.54

[56] References Cited
U.S. PATENT DOCUMENTS 3,910,597 10/1975 Seko ................................... 74/552 X
4,485,371 11/1984 Yamada et al. .................... 74/552 X

FOREIGN PATENT DOCUMENTS 485539 10/1953 Italy ................................ 74/484 R
49-17167 4/1974 Japan .............................. 74/484 R
0198141 12/1982 Japan ............................. 200/61.54

Primary Examiner—Lawrence Staab
Assistant Examiner—Martin G. Belisario
Attorney, Agent, or Firm—Armstrong, Nikaido, Marmelstein & Kubovcik

[57] ABSTRACT

An automotive steering wheel assembly has a hub pad kept stationary during rotation of a steering wheel. The hub pad is attached to an upper annular member rotatable about a hub and coaxial to a non-rotatable lower annular member axially spaced from the upper member. A carrier is fixed to the hub and supports a planet gear for rotation about its own axis and for revolution about the axis of the hub in meshing engagement with internal gear teeth formed on the upper and lower members so that rotation of the hub causes the planet gear to revolve about the hub axis to keep the upper member and thus the hub pad apparently stationary. The planet gear is formed thereon with an annular flange having opposite end faces in slidable engagement with opposed faces of the upper and lower members to prevent the upper member from being distorted by the force exerted by a driver to the hub pad.

6 Claims, 5 Drawing Figures

STEERING WHEEL ASSEMBLY

FIELD OF THE INVENTION

The present invention relates to a steering wheel assembly for use in automobiles or other vehicles and, more particularly, to a steering wheel assembly of the type that includes a steering wheel body including a rim, at least one spoke having a radially outer end connected to the rim and a hub connected to the radially inner end of the spoke and adapted to be detachably secured to a steering shaft of a vehicle, said hub having a substantially cylindrical upper portion; an upper member defining therein a central opening through which the upper cylindrical portion of the hub rotatably extends, the upper member having an outer peripheral portion formed thereon with internal gear teeth arranged on a circle substantially coaxial to the axis of the hub; a pad mounted on the upper member to cover the top thereof; a lower member substantially coaxial to but axially spaced from the upper member, the lower member defining therein a central opening substantially coaxial to the axis of the steering shaft and having an outer peripheral portion formed thereon with internal gear teeth arranged on a circle substantially coaxial to the axis of the sterring shaft; at least one planet gear disposed in meshing engagement with the internal gear teeth of the upper and lower members; a carrier fixed to the hub for rotation therewith and supporting the planet gear for rotation about the axis thereof; and means for mechanically connecting said lower member to a stationary member of the vehicle so that said lower member is kept stationary during rotation of said steering wheel body; the rotation of said steering wheel body causing said planet gear to be revolved about the axis of said steering shaft while said planet gear is rotated about its own axis with the teeth thereof engaged with the internal gear teeth of said upper and lower members so that said upper member is rotated relative to said steering wheel body in a direction opposite to the direction of rotation thereof whereby said upper member is kept apparently stationary.

SUMMARY OF THE INVENTION

The present invention has its object to provide an improvement in a steering wheel assembly of the type specified above.

The improvement according to the present invention comprises a flange fixed to the planet gear and extending radially outwardly therefrom into the axial space between the upper and lower members. The flange has opposite axial end faces in slidable engagement with the upper and lower members to eliminate any play and distortion of the upper and lower members in the rotational and axial directions which otherwise would take place due to dimensional changes of these members which in turn are caused by an external force applied by an operator or by undue temperature variation, whereby the flange advantageously enhances the stability and smooth relative rotation of the upper member and assures a smooth rotation of the upper and lower members relative to the planet gear.

DESCRIPTION OF THE PRIOR ART

Figure 1:
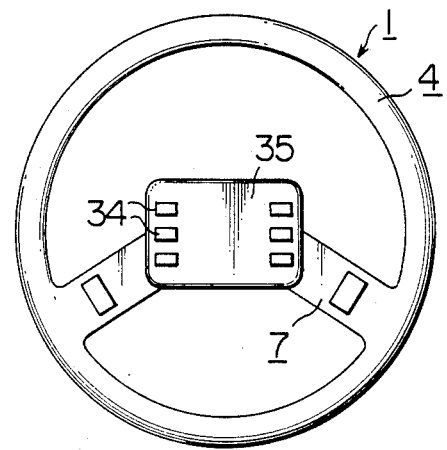
FIG. 1 is a plan view of a conventional steering wheel assembly.

Hitherto, a steering wheel assembly has been proposed in which operating means for various operation mechanisms are mounted on a central pad which is kept non-rotating during rotation of a steering wheel rim, as disclosed, for instance, in Japanese Utility Model laid-Open Publication No. 80361/1983.

A typical example of the known steering wheel device will be described hereinunder with specific reference to FIGS. 1 to 3.

The typical known steering wheel assembly with a non-roratable central pad has a steering wheel body generally designated at reference numeral 1. The steering wheel body 1 includes a ring-shaped rim 4 constituted by a metallic rim core 2 and a rim cover 3 covering the rim core 2, generally radial spokes 7 constituted by metallic spoke cores 5 welded at their outer ends to the rim core 2 and spoke covers 6 covering the spoke cores 5, and a hub 8 welded to the radially inner ends of the spoke cores 5. The hub 8 is constituted by a lower base portion 9 welded to the inner ends of the spoke cores 5, and annular flange 10 disposed upwardly of the lower base portion 9, and a cylindrical portion 11 disposed upwardly of the flange 10 and provided at its upper peripheral portion with an annular groove 12. The hub 8 defines therein a central bore which is fitted over the upper end of a steering shaft 13 and is fixed to the steering shaft 13 by means of a nut 14.

An upper annular member 15 formed in one body from a plastic material has an inner cylindrical portion 16 and an internally toothed outer peripheral cylindrical portion 17. The internal teeth are denoted by numeral 18. The inner cylindrical portion 16 is rotatably engaged with the outer peripheral surface of the cylindrical portion 11 of the hub 8. a snap ring 19 fits in the annular groove 12 in sliding contact with the upper face of the fitting cylindrical portion 16 to prevent the upper cylindrical member 15 from coming off.

A lower cylindrical member 20, which is also formed in one body from a plastic material, has an inner lower cylindrical mounting portion 21 and an internally toothed outer peripheral cylindrical portion 22. The internal teeth are denoted by numeral 23. The inner mounting portion 21 fits around a steering column 24 which rotatably receives the steering shaft 13. The lower cylindrical member 20 is fixed to the steering column 24 by means of a screw 25 which is screwed through a hole formed in the wall of the mounting portion 21 into a hole formed in the wall of the steering column 24.

A plurality of carriers 26 have mounting portions 27 secured by screws 28 to central portions of the spoke cores 5. A plurality of planet gears 29 are in meshing engagement with the internal gear teeth 18 and 23 on the upper and lower cylindrical members 15 and 20 and rotatably mounted on support shafts 20 carried by the carriers 26.

An electric unit 31 is secured to the upper cylindrical member 15 through a bracket 32 by means of screws 33. A plurality of push buttons 34 are provided on the upper surface of the electric unit 31. A pad 35 covers the electric unit 31 so that the push buttons 34 project upwardly through apertures in the top of the pad 35.

When the steering wheel body 1 is rotated, the gears 29 revolve about the shaft 13 while meshing with the internal teeth 23 of the lower cylindrical member 20 and while rotating about their own axes. Since the gears 29 mesh also with the internal gear teeth 18 of the upper cylindrical member 15, the upper cylindrical member 15 is relatively rotated in the direction opposite to the direction of rotation of the steering wheel body 1, so that the electric unit 31 and the pad 35 as well as the upper cylindrical member 15 are apparently held unrotated.

The following problems or difficulties are encountered by this known steering wheel assembly: Firstly, it is to be pointed out that a high degree of dimentional precision is required for the upper and lower cylindrical members 15 and 20 and a very high mounting precision is needed for the lower cylindrical member 20. This is because the gears 29 which mesh with the internal gear teeth 18 and 23 of the upper and lower cylindrical members 15 and 20 support the outer cylindrical portions 17 and 22 thereof only in the radially outward direction. In addition, the pad 35 tends to become angularly movable relative to the gears 29 due to change in the sizes of the upper and lower cylindrical members 15 and 20 as a result of changes in temperature. Moreover, since the upper cylindrical member 15 merely rotatably engages with the hub 8, the pad 35 tends to be unstably tilted when a large external force is applied to its peripheral region. Consequently, it often takes place that the upper cylindrical member 15 cannot be smoothly rotated relative to the planet gear 29.

DESCRIPTION OF A PREFFERD EMBODIMENT

Figure 3:
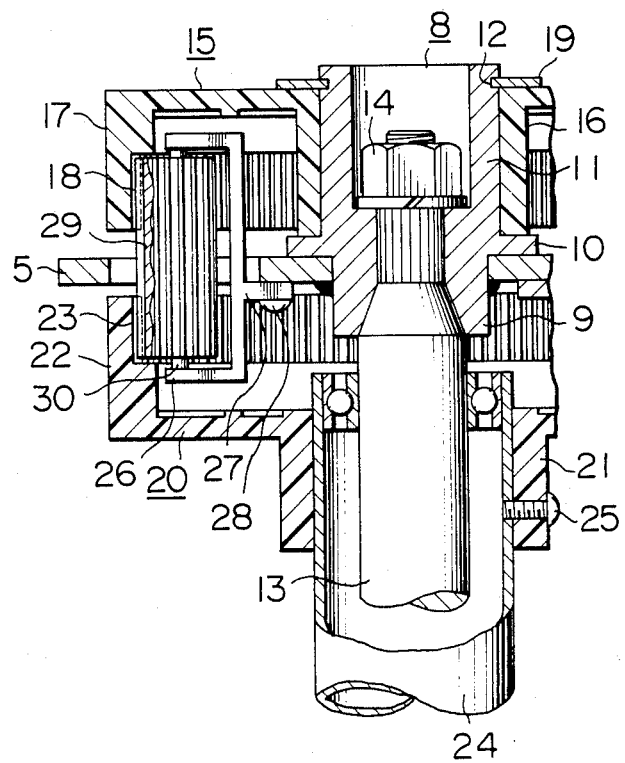
FIG. 3 is an enlarged fragmentary sectional view of a steering wheel assembly shown in FIG. 1.
Figure 4:
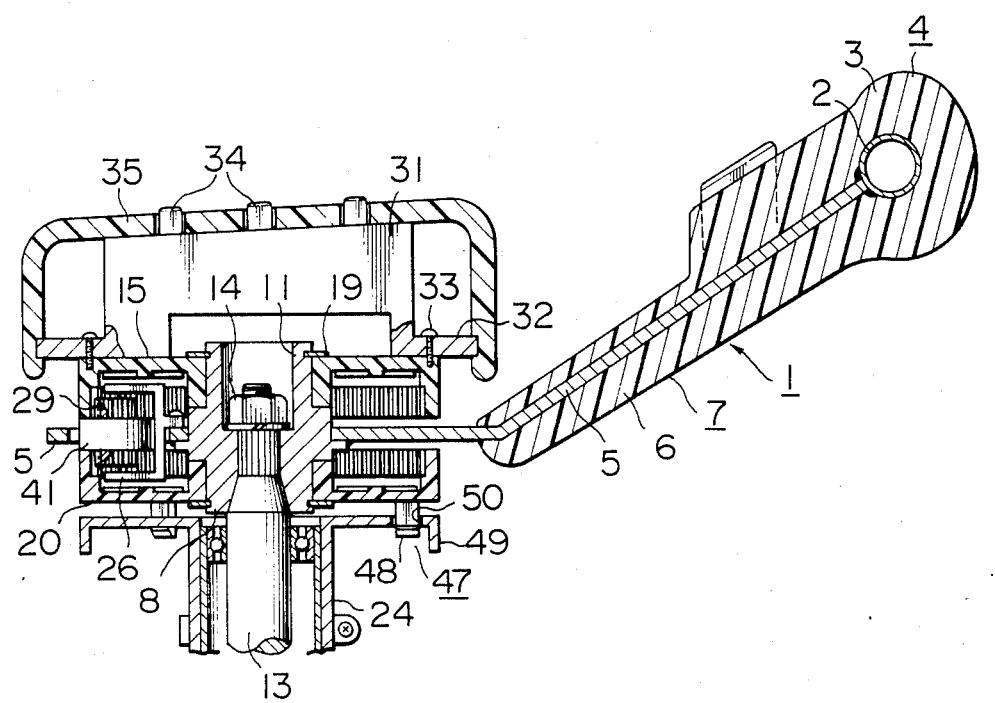
FIG. 4 is a fragmentary sectional view of an embodiment of a steering wheel assembly in accordance with the invention.
Figure 5:
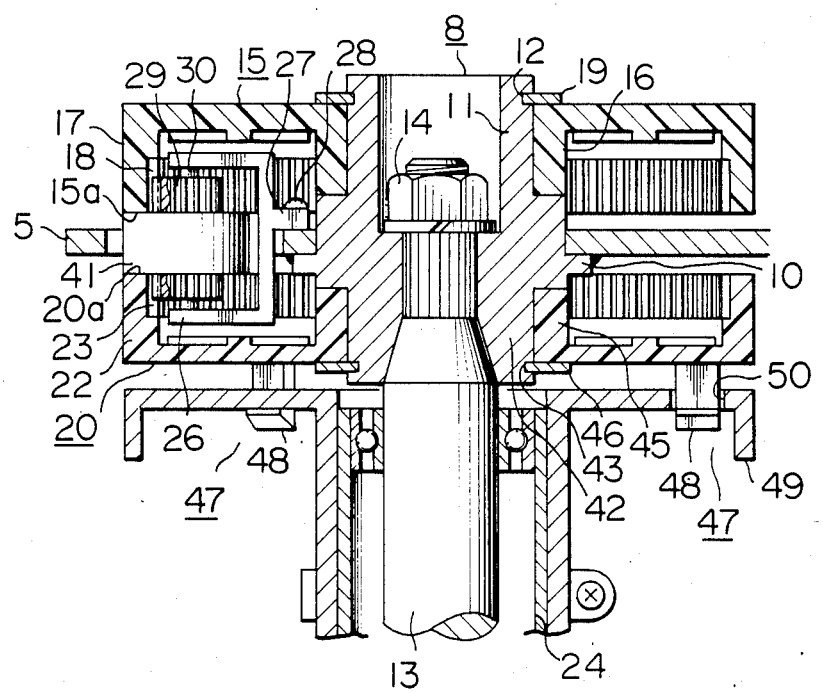
FIG. 5 is an enlarged sectional view of a portion of the embodiment shown in FIG. 4.

FIGS. 4 and 5 show an embodiment of the steering wheel assembly of the invention. In these drawings, the same reference numerals are used to denote the parts or members the same as those appearing in FIGS. 1 to 3 so as to save unnecessary repetitions of descriptions thereof.

In this embodiment, each gear 29 is provided at its axial mid portion with a circular flange 41 which is contacted at its upper and lower surfaces by the lower and upper end surfaces 15a and 20a of the outer cylindrical wall portions 17 and 22 of the upper and lower cylindrical members 15 and 20, respectively. The hub 8 has a lower cylindrical portion 42 downward of the flange 10 and is provided with an annular groove 43 formed in the outer peripheral surface of the lower cylindrical portion 42.

The inner cylindrical portion 16 of the upper cylindrical member 15 is rotatably engaged with the upper cylindrical portion 11 of the hub 8. The snap ring 19 fitted in the annular groove 12 in the hub 8 contacts the upper face of the cylindrical portion 16 to prevent the upper cylindrical member 15 from coming off the hub 8.

In contrast to the prior art steering wheel assembly described with reference to FIGS. 1 to 3, the lower cylindrical member 20 does not have the cylindrical mounting portion 21 secured to the steering column, but, instead, is provided with an inner cylindrical portion 45 which is rotatably engaged with the outer peripheral surface of the lower cylindrical portion 42 of the hub 8. A snap ring 46 fitted in an annular groove 43 formed in the lower cylindrical portion 42 of the hub 8 contacts the bottom face of the cylindrical portion 45 to prevent the lower cylindrical member 20 from coming off the hub 8.

The lower cylindrical member 20 is fixed to a steering column 24 by a fixing means 47 which comprises a plurality of projections 48 formed on the lower face of the lower cylindrical member 20 and a plurality of apertures 50 formed in the upper face of a combination switch case 49 fixed to the steering column 24. The apertures 50 correspond in number and positions to the projections 48 and receive respective projections to prevent the lower cylindrical member 20 from being rotated relative to the steering column 24. Other portions are essentially identical to those of the known steering wheel assembly shown in FIGS. 1 to 3.

In operation, when the steering wheel body 1 is rotated, the hub 8 and the shaft 13 are rotated as a unit with the steering wheel body 1, but the lower cylindrical member 20 is not rotated because the projections 48 engage the apertures 50 in the combination switch case 49 which is fixed to the steering column 24.

Figure 2:
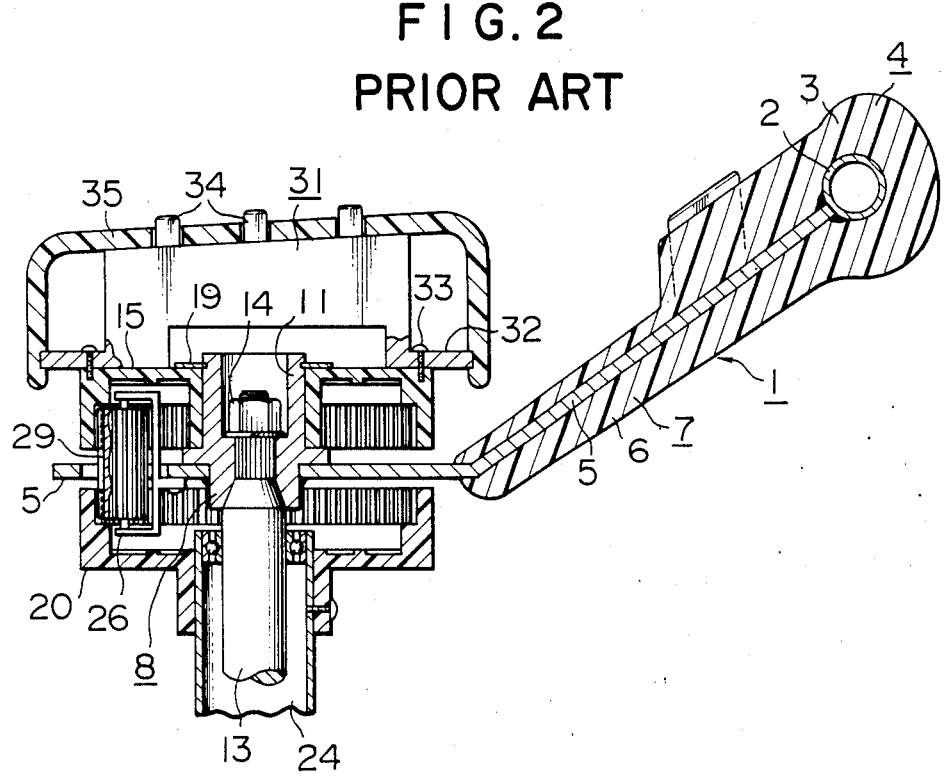
FIG. 2 is an enlarged fragmentary sectional view of a steering wheel assembly shown in FIG. 1.

Consequently, as in the case of the prior art shown in FIGS. 1 to 3, the carriers 26 are rotated together with the spoke cores 5 while the gears 29 revolve on the internal gear teeth 23 of the lower cylindrical member 20 and simultaneously rotate about their own axes. Since the gears 29 mesh also with the internal gear teeth 18 on the upper cylindrical member 15, the revolution and rotation of the gears cause the upper cylindrical member 15 to rotate in the direction counter to the rotation of the carriers 26, so that the upper cylindrical member 15 carrying the electric unit 31 and the pad 35 is kept apparently unrotated.

According to the invention, since the gears 29 have flanges 41 which are in sliding contact at the upper and lower sides with the lower end surface 15a of the outer peripheral wall portion 17 of the upper cylindrical member 15 and with the upper end surface 20a of the outer peripheral wall portion 23 of the lower cylindrical member 20, the upper cylindrical member 15 is not distorted even when the pad 25 is pressed axially by an operator's hand when be manipulates the push buttons 34 of the electric unit 31. Therefore, failure of rotation attributable to distortion of the upper cylindrical member 15 is advantageously avoided.

The fixing means 47 of the illustrated embodiment may be modified such that the projections 48 be formed on the combination switch case 49 and the apertures 50 in the lower cylindrical member 20.

The lower cylindrical member 20, which is fixed to the combination switch case 49 in the illustrated embodiment, may alternatively be fixed to the steering column 24 itself as shown in FIG. 2 or to another stationary member fixed to the steering column 24.

The upper and lower cylindrical members 15 and 20 are preferably identical in shape so as to enhance the adaptability of the component parts.

The lower cylindrical member 20, which is rotatably engaged with the hub 8 in the illustrated embodiment, may alternatively be non-rotatably engaged with the steering column 24 as in the prior art shown in FIGS. 2 and 3.

What is claimed is:

1. In a steering wheel assembly of the type that includes:

a steering wheel body including a rim, at least one spoke having a radially outer end connected to said rim and a hub connected to the radially inner end of said spoke and adapted to be detachably secured to a steering shaft of a vehicle, said hub having a substantially cylindrical upper portion;

an upper member defining therein a central opening through which said upper cylindrical portion of said hub rotatably extends, said upper member having an outer peripheral portion formed thereon with internal gear teeth arranged on a circle substantially coaxial to the axis of said hub;

a pad mounted on said upper member to cover the top thereof;

a lower member substantially coaxial to but axially spaced from said upper member, said lower member defining therein a central opening substantially coaxial to the axis of said steering shaft and having an outer peripheral portion formed thereon with internal gear teeth arranged on a circle substantially coaxial to the axis of said steering shaft;

at least one planet gear disposed in meshing engagement with said internal gear teeth of said upper and lower members;

a carrier fixed to said hub for rotation therewith and supporting said planet gear for rotation about the axis thereof; and means for mechanically connecting said lower member to a stationary member of the vehicle so that said lower member is kept stationary during rotation of said steering wheel body;

the rotation of said steering wheel body causing said planet gear to be revolved about the axis of said steering shaft while said planet gear is rotated about its own axis with the teeth thereof engaged with the internal gear teeth of said upper and lower members so that said upper member is rotated relative to said steering wheel body in a direction opposite to the direction of rotation thereof whereby said upper member is kept apparently stationary;

the improvement which comprises a flange fixed to said planet gear and extending radially outwardly therefrom into the axial space between said upper and lower members, said flange having opposite axial end faces in slidable engagement with said upper and lower members.

2. A steering wheel assembly according to claim 1, wherein said hub has a substantially cylindrical lower portion rotatably extending through said central opening of said lower member.

3. A steering wheel assembly according to claim 2, wherein said mechanically connecting means comprises at least one projection formed on one of said lower member and said stationary member and an aperture formed in the other member and engaged with said projection.

4. A steering wheel assembly according to claim 3, wherein said projection is formed on said lower member and said aperture is formed in said stationary member.

5. A steering wheel assembly according to claim 1, wherein said stationary member is a steering column enclosing said steering shaft and having a portion extending through said central opening in said lower member and wherein said mechanically connecting means comprises at least one screw fixing said lower member to said steering column.

6. A steering wheel assembly according to claim 1, wherein said flange is annular and integral with said planet gear.

* * * * *